US005979187A

United States Patent [19]

[11] Patent Number: 5,979,187
[45] Date of Patent: Nov. 9, 1999

Churchley et al.

[54] LAMP CONSTRUCTION AND METHOD FOR FORMING

[76] Inventors: Martin Ross Churchley, 67 Watermead, Bar Hill Cambridge CB3 8TL; Janusz Karol Lewandowski, 108 Fairfields, Thetford Norfolk IP24 1LB, both of United Kingdom

[21] Appl. No.: 08/766,969

[22] Filed: Dec. 16, 1996

[30] Foreign Application Priority Data

Dec. 16, 1995 [GB] United Kingdom .................. 9525776

[51] Int. Cl.$^6$ .............................. H01J 9/32; C03B 23/13; C03C 27/00

[52] U.S. Cl. .................................. 65/32.2; 65/34; 65/41; 65/43; 65/55; 65/59.2; 65/59.22; 65/59.25; 65/59.27; 65/59.28; 65/59.6; 65/108; 445/26; 445/28; 445/29

[58] Field of Search ................................ 65/32.2, 34, 41, 65/43, 54, 55, 57, 59.2, 59.22, 59.23, 59.25, 59.27, 59.28, 59.31, 59.33, 59.35, 59.6, 108, 109, 110; 445/28, 26, 29, 33, 44

[56] References Cited

U.S. PATENT DOCUMENTS

| | | |
|---|---|---|
| 2,093,491 | 9/1937 | Shermund . |
| 2,279,818 | 4/1942 | Freeman . |
| 2,561,061 | 7/1951 | Leuzarder et al. . |
| 2,569,723 | 10/1951 | Koerbis . |
| 2,675,497 | 4/1954 | Meister et al. . |
| 2,705,220 | 3/1955 | Arthur . |
| 3,230,028 | 1/1966 | Kayatt . |
| 3,244,929 | 4/1966 | Kuhl . |
| 3,304,144 | 2/1967 | Anderson . |
| 3,320,012 | 5/1967 | Anderson . |
| 4,086,075 | 4/1978 | Ekkelboom et al. . |
| 4,202,999 | 5/1980 | Holle et al. . |
| 4,203,050 | 5/1980 | Rech et al. . |
| 4,827,189 | 5/1989 | Achter et al. . |

FOREIGN PATENT DOCUMENTS 2308226 6/1997 United Kingdom .

*Primary Examiner*—Steven P. Griffin

[57] ABSTRACT

In a method of forming a glass to metal seal between one end of a glass lamp tube (for, for example, a flash lamp or laser lamp), a metal rod which is terminated by the electrode is heated, and has molten glass sealing material applied thereto to form a beaded sleeve. The tube to which the electrode is to be attached is heated, and further sealing material is applied to the end of the tube so as to create a dome of material which closes off that end. Excess sealing material is then removed from the dome so as to leave an annulus of sealing material around the end wall of the, now open, tube. The electrode and rod can then be inserted into the tube until the bead on the rod is near the annulus at the end of the tube, and the tube can be worked, while being rotated, down to form a frusto-conical end such that movement of the bead relative to the annulus then brings the two into contact while a positive gas pressure is maintained within the tube. The pressure between the inside and outside of the tube is then balanced while the tube is worked down onto the bead to cause the bead in the annulus to become completely fused. The tube is then pressurized so that the sealing material conforms to a smooth internal concave shape. Since the annulus of material is formed by removing excess material from the dome, it is possible to avoid the need to bring a carbon tool into contact with the annulus, thus avoiding possible contamination of the sealing material.

21 Claims, 6 Drawing Sheets

LAMP CONSTRUCTION AND METHOD FOR FORMING

FIELD OF THE INVENTION

This invention concerns lamps such as are used as flash lamps and laser lamps, and in particular to the construction of the ends of such lamps and a method of effecting the sealing of electrodes into the ends thereof.

BACKGROUND TO THE INVENTION

Flash and laser lamps are generally constructed from a tube of fused silica/quartz opposite ends of which contain metal electrodes to which electrical operating power is supplied via conductive supports, which also serve to mount the lamp in a lamp holder, when in use.

Due to the different co-efficients of expansion of metal and fused silica/quartz, special materials have been developed, to interpose between the metal conductive supports for the electrodes and the tube wall of such lamps, to accommodate the differential rates of expansion, as the lamp increases and decreases in temperature in use. Typically the electrodes are constructed from Tungsten and an intermediate sleeve of a glass like material having an appropriate coefficient of expansion, such as a seal glass such as GS10, is formed around the Tungsten rod before it is introduced into and sealed to an end of the lamp tube. Sealing glass is supplied inter alia by GB Glass Ltd., and GS10 sealing glass as supplied by GB Glass has been used with quartz and tungsten combinations.

As used herein the expression GS is intended to mean any suitable material which can be bonded to a metal electrode and likewise fused to fused silica/quartz materials and whose coefficient of expansion is such as to accommodate the generally greater expansion of metal (for a given temperature rise), than is produced in fused silica/quartz by the same rise in temperature. GS10 seal glass is an example of a GS material.

The constructional steps of the known method leading to the formation of a glass to metal seal at an end of a fused silica/quartz tube are as follows:

(1) A Tungsten electrode is prepared to receive a sleeve of GS seal glass, by heating and rotation about its length axis (2) A stick of GS is also heated and as the end becomes molten, it is brought into contact with the rotating heated Tungsten rod support which extends axially from the Tungsten electrode so that molten glass becomes attached to and "smeared" over the surface of the rod to form a relatively uniform thickness sleeve over approximately 1–2 cms of the length of the rod;

(3) The central region of the sleeve is increased in thickness by reheating it and a GS stick, and while the sleeved rod is rotated, touching the end of the glass stick against the central region of the sleeve to cause an annular build-up of GS to occur. The step is commonly referred to as "spinning a bead" onto the sleeve;

(4) Next a length of fused silica/quartz tube, cut to the desired length of the lamp housing, is heated at one end whilst being rotated around its length axis, and the heated end is closed by spinning a bead of molten GS into and over the heated end of the tube. (The GS10 stick is of course heated before it is brought into contact with the heated end of the tube);

(5) One end of a smaller diameter tube of fused silica/quartz is then heated, the interior of the lamp tube is pressurized with a non-oxidising gas, typically and usually nitrogen, and a region of the wall thereof is heated until soft to permit the heated end of the smaller diameter tube to be pushed therethrough and fused thereto, so as to extend radially as a side tube therefrom. By pushing the end of the smaller diameter side tube through the locally heated, softened region of the lamp tube wall, the interior of the latter communicates with the interior of the side tube, and this communication is maintained by maintaining a positive gas pressure in the lamp tube whilst the fusing is completed. After this the heating is removed;

(6) The end of the radially protruding side tube which has just beep added is now closed by heating the outboard end thereof to collapse the side tube wall;

(7) The previously closed end of the fused silica/quartz lamp tube is now reheated, and the internal pressure of the assembly of tubes is increased, so as to cause the GS10 dome which has closed the heated lamp tube end, to balloon axially and puncture.

(8) Whilst rotating the lamp tube and keeping the punctured end hot and near molten, a carbon tool is introduced into the punctured end and the diameter of the opening in the GS dome is made concentric with the lamp tube axis and enlarged so as to be capable of receiving the electrode;

(9) The electrode and its integral sleeved rod is now introduced axially into the opened end of the lamp tube whilst the latter is rotated, until the annular bead makes contact with the end of the lamp tube. Both are reheated until the GS becomes molten and can be worked, using a carbon tool, so as to cause the ring of GS defining the open end of the lamp tube to become merged with the GS10 bead on the Tungsten rod, and the GS material to become fused into a uniform annular seal.

A lamp requires a similar arrangement at the opposite end, and the appropriate steps may be repeated at the opposite end of the lamp tube to enable a second electrode to be sealed in a similar manner into the said opposite end.

Final assembly of a lamp involves evacuation of the lamp tube assembly and usually the introduction of a specific gas usually at low pressure, via the side tube, which is then finally closed off and sealed by heating.

Lamps constructed in accordance with the above method have been found to possess a weakness in the end regions thereof where a GS to GS seal has been formed. Investigations have indicated possible reasons for this weakness and it is an object of the present invention to provide an improved method which reduces the chance of weakness being introduced into the structure by the manufacturing process.

SUMMARY OF THE INVENTION

According to one aspect of the present invention an improved process for the formation of a glass to metal seal at one end of a quartz lamp tube as part of a process of manufacturing a complete lamp tube, comprises steps (1) to (5) inclusive of the above method followed by the following steps:

(1) reheat the GS dome closing off the end of the tube and remove the excess GS material so as to leave an annulus of GS around the end wall of the opening in the quartz tube;

(2) insert the electrode and protruding Tungsten rod until the GS bead previously spun around the rod is near to the GS annulus at the end of the quartz tube;

(3) heat the quartz tube and work the end thereof down to form a frusto-conical end so that the annulus of GS is now only just greater in diameter than the GS sleeve around the Tungsten rod protruding therethrough;

(4) axially move the electrode and rod so as to bring the GS bead on the rod into contact with the annulus of GS around the now frusto-conical end whilst maintaining a positive gas pressure within the lamp tube at least until the bead touches the annulus;

(5) momentarily balancing the pressure between the inside and outside of the lamp tube after the bead has fused to the annulus whilst using a carbon tool to work the quartz tube down onto the bead and cause it and the annulus of GS material to become more completely fused;

(6) increasing the internal gas pressure within the lamp tube assembly to obtain a smooth internal concave surface to the fused GS material, and (7) allow the assembly to cool and then locally reheat the assembly using a movable, local source of heat, and move the heat source axially along the tube, to stress relieve the assembly.

Advantageously the gas used to pressurize the lamp tube is a non-oxidising gas which is stable and non-reactive within the heated environment of the lamp tube as it is worked.

Typically nitrogen is used.

It will be noted that the above method permits the working of the end of the tube by means of a carbon tool in such a way that the latter never comes into contact with the inside of the GS sleeve. This is of considerable significance since it is believed that the use of the carbon tool to open and flare the GS material at the end of the lamp tube in the previously known method can introduce impurities and contaminants into the GS material which may be a contributory factor in failures of GS to GS seals.

After the stress relieving step, a similar process can be performed at the opposite end of the tube so as to form a similar glass to metal seal between the other end of the tube and a second Tungsten electrode rod.

Conveniently the final silica/quartz lamp tube is secured in a rotatable chuck whilst it is being worked on in accordance with the method of the invention.

Preferably drive means is provided for rotating the chuck.

Preferably the chuck includes a gas connection with a rotatable bearing seal to permit a supply of gas (typically Nitrogen) to the interior of the lamp tube through the centre of the chuck to permit the internal gas pressure within the lamp tube to be increased as and when required during the processing.

The supply of gas to the inside of the tube via an unworked open end of the tube within the chuck, is no longer possible once the lamp tube has been closed and an electrode embedded at one end thereof, and the gas must now be supplied to the inside of the lamp tube via the side tube previously secured thereto. To this end the chuck preferably also includes a rotatable manifold supplied with gas via a rotatable joint seal and a tube is available to connect the manifold to the side tube of a partially completed lamp when the closed end thereof has been inserted and secured in the chuck. Since the lamp is fixed to the chuck and rotates therewith, and since the gas manifold also rotates with the chuck (since it forms part of the chuck), there is no relative movement between the side tube and the manifold thereby permitting the gas connection via the aforementioned tube, which may be of flexible material.

According to a preferred feature of the invention, a method of forming the opposite end of a partially completed lamp tube, comprises the steps of:

(1) fitting the partially completed lamp tube into a rotatable chuck with the closed end inside the chuck;

(2) fitting to the side tube protruding from the lamp tube a gas line communicating between it and a rotatable manifold, to convey gas to the inside of the lamp tube via the side tube;

(3) closing off the open end of the lamp tube in the manner previously described by means of a dome of GS material;

(4) reheating the GS dome and removing excess material to leave an annular ring of GS material around the end of the lamp tube;

(5) introducing a Tungsten electrode having an integral axial support rod into the open end, having a previously formed GS bead around the rod, in manner known per se;

(6) heating the end of the lamp tube and, using a carbon tool, working the tube end down to form a frusto-conical end so that with axial movement of the rod relative to the tube to facilitate the merging of the bead and the annulus of GS, the latter can become fused to the bead of CS on the rod;

(7) momentarily balancing the pressure as between the inside and outside of the now closed tube and, using a carbon tool, working the external surface of the lamp tube down onto the bead to cause the GS material to more completely fuse and form a good glass to metal seal between the rod and the lamp tube;

(8) increasing the internal gas pressure within the tube to ensure a smooth internal concave surface to the GS seal at the end of the lamp tube; and (9) cooling the assembly and thereafter applying a source of heat locally at spaced apart positions along the length of the assembly to stress relieve the tube and the region of the GS seal.

At this stage the assembly comprises a lamp tube, sealed at both ends with a glass to metal seal to two Tungsten electrode assemblies with conductive support rods protruding through the glass to metal to seal to provide electrical connections outwith the assembly. The side tube is still connected to a source of gas (normally a non-oxidising gas) and the whole assembly in that event will be filled with non-oxidising gas under pressure. If the gas supply is removed from the side tube, the non-oxidising gas may become replaced with air containing Oxygen and since it is desirable to maintain a non-oxidising environment within the lamp tube, the side tube is preferably sealed by the application of a local source of heat, whilst maintaining the internal over pressure, so that the charge of non-oxidising gas is retained in the lamp tube.

Subsequent processing of the lamp so as to create a partial vacuum therein, or to allow for the introduction of selected gases, albeit at low pressure, can be effected by re-opening the side tube and connecting the lamp to a vacuum pump and appropriate gas source(s) before finally re-sealing the side tube.

As with the process of closing the first end of the lamp tube, the process according to the invention by which the opposite end is closed also does not require a carbon tool to come into contact with any internal surface of GS material whilst the latter is molten, so that there is less risk of contamination of the GS material and the integrity of the GS glass to metal seal is maintained.

The invention also provides a flash lamp or laser lamp having end regions having glass or metal seals, constructed in accordance with the invention.

Although the invention has been described in relation to sealing glass, specifically type GS10 from GB Glass Ltd, it is to be understood that any other suitable sealing material may be used in place of sealing glass.

Whilst the lamp tube is described as being of quartz and the electrodes and connecting conductors are described as being formed from Tungsten, it is to be understood that the invention is not limited to the use of any particular material (s) for the lamp tube or for the electrodes, and the materials mentioned are merely exemplary of those typically employed in the construction of such lamps. Where quartz is used, fused silica tubes as supplied by Heraeus Quarzglas GmbH may be used.

Tungsten from the electrode assemblies may be such as is supplied by Plansee Metals GmbH.

BRIEF DESCRIPTION OF THE DRAWINGS

The invention will now be described, by way of example only, with reference to the accompanying drawings, in which.

DETAILED DESCRIPTION

Figure 1:
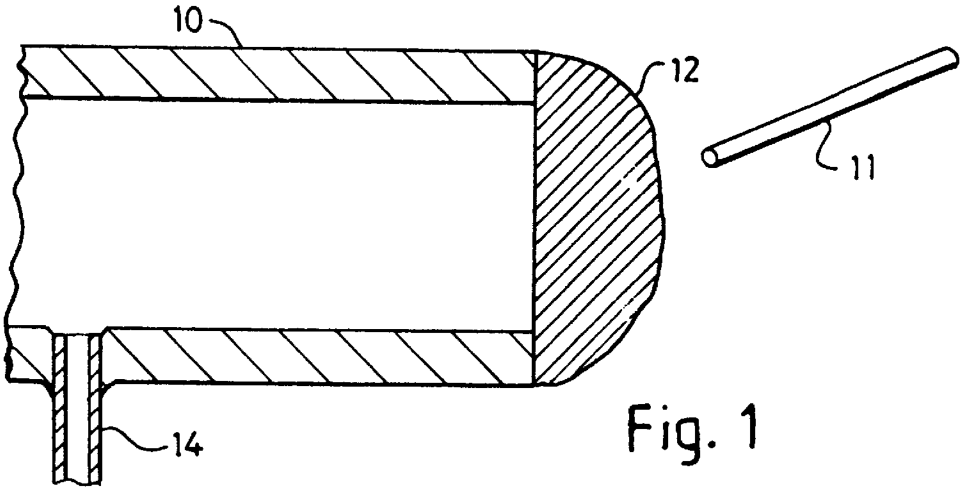
FIGS. 1 to 7 show different steps in the method according to the invention.

FIG. 1 shows the right hand end of a quartz tube 10 to which has been applied a dome of GS10 glass to metal sealing material 12 which effectively closes off the right hand end of the tube. Some way along the length of the tube a smaller diameter capillary tube 14 is shown fused into the wall of the tube 10 so that it communicates with the interior of the tube 10. In known manner the side tube 14 can be closed by fusing the end with a gas flame and re-opened by simply cutting off the fused end when required.

In order to remove excess GS10 from the dome 12, the dome 12 is heated by an oxy fuel flame while the tube 10 is rotated about its axis, until the material constituting the dome 12 is evenly heated to its melting point.

A small diameter rod 11 of GS10 is then fused to the molten dome 12 and then pulled away slowly whilst the pressure of gas (in this example Nitrogen) within the tube 10 is controlled so that the dome 12 does not collapse or rupture. The dome 12 also continues to be heated so that it is maintained at a sufficiently even temperature. Under these conditions, the drawing of the rod 11 away from the dome 12 removes excess GS10 material from the dome 12.

Figure 2:
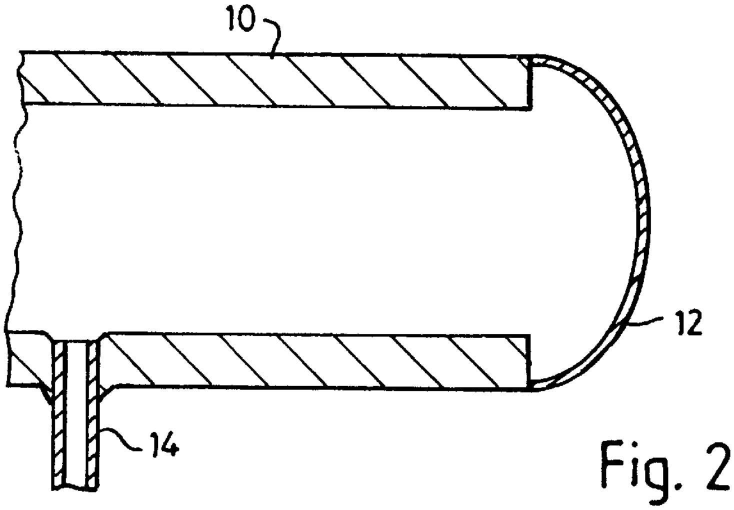

This process is repeated until only approximately five percent of the original dome 12 remains. FIG. 2 shows the end of the tube 10 after excess material has been removed from the dome 12. It can be seen that the dome 12 is now almost "bubble like".

Figure 3:
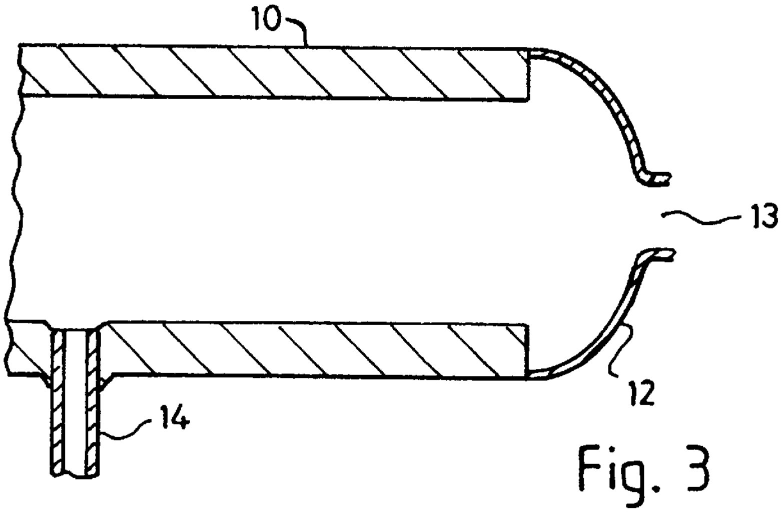

The oxy flame continues to maintain the temperature of the dome 12 while more Nitrogen is introduced into the tube 10 to increase the internal gas pressure on the dome 12 until a small hole is burst in the centre of the dome. That hole is referenced 13 in FIG. 3.

Figure 4:
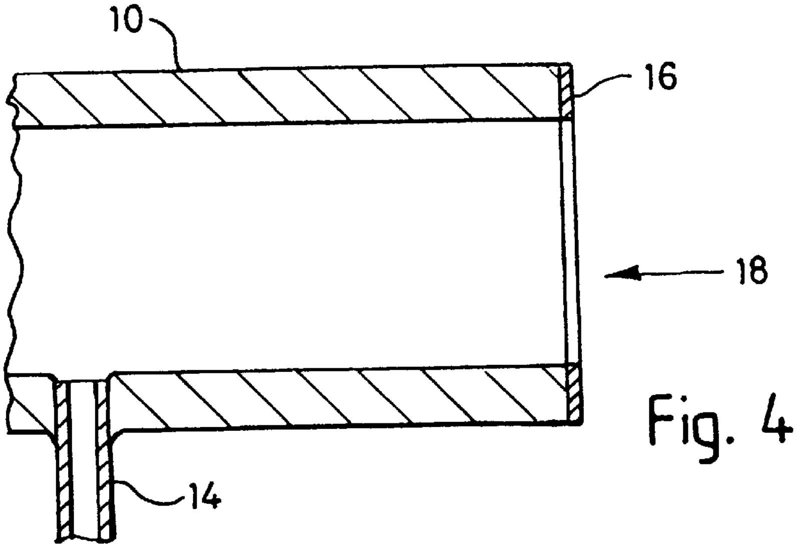

It has been found that continued heating of the ruptured dome 12 causes the GS10 to melt back towards the tube 10 where it forms the thin annulus referenced 16 in FIG. 4. It is believed that such movement of the GS10 constituting the ruptured dome 12 is caused by surface tension and viscosity of the GS10.

It will be appreciated that other tools, for example tweezers, may be used instead of the rod 11 to remove excess material from the dome 12.

As can be seen from FIG. 4 the annulus 16 of GS10 glass to metal sealing material surrounds the end 18 of the tube 10 which is now open and can receive an electrode.

Figure 5:
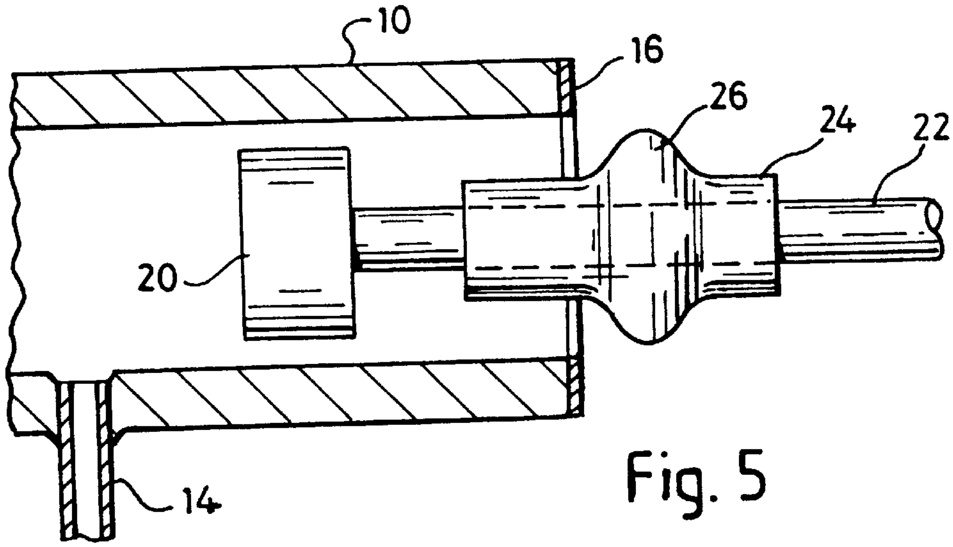

FIG. 5 shows an electrode 20 and electrode support/connector rod 22 which is formed integrally therewith which has been introduced into the open end 18 in accordance with the next step of the process. The rod 22 has previously had formed thereon a GS10 sleeve 24 and annular bead 26 in manner known per se.

The electrode assembly 20–26 is introduced into the end sufficiently for the bead 26 to be relatively close to the GS10 annulus 16.

Figure 6:
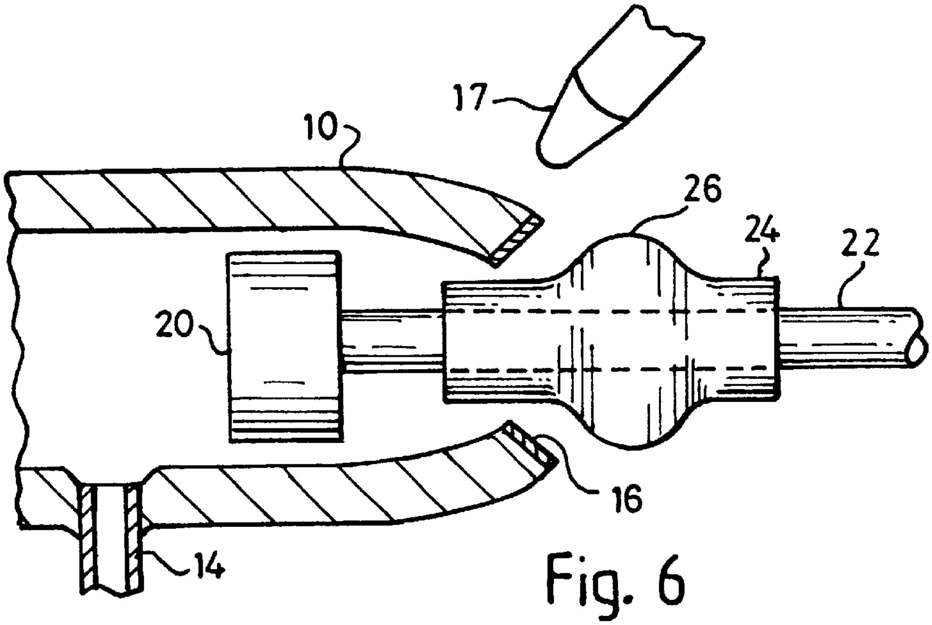

FIG. 6 shows the next step in the process in which the end of the tube 10 containing the GS10 annulus 16 has been heated and worked using a carbon tool 17 or the like so that the end containing the annulus 16 has been formed into a frusto-conical shape so that the internal diameter of the end of the tube is substantially the same as the external diameter of the GS10 sleeve 24 and the GS10 annulus 16 is now proximate to and can be fused into the annular bead 26. To this end the end of the tube 10 and the bead 26 are heated using a gas flame or the like until the GS10 material is molten and relative movement is effected between the rod 22 and the tube 10 to cause the bead 26 and annulus 16 to come into contact and begin to fuse. The tube 10 and the rod 22 are preferably rotated synchronously whilst this is occurring and Nitrogen gas at greater than atmospheric pressure is introduced into the interior of the tube 10. This can either be introduced via the side tube 14 or through the opposite open end of the tube 10 in which event the side tube 14 must be closed off.

The pressure between the inside and the outside of the tube 10 is then momentarily balanced while the tube 10 is worked down onto the bead 26 to cause the bead 26 and the tube 10 to become more completely fused.

Figure 7:
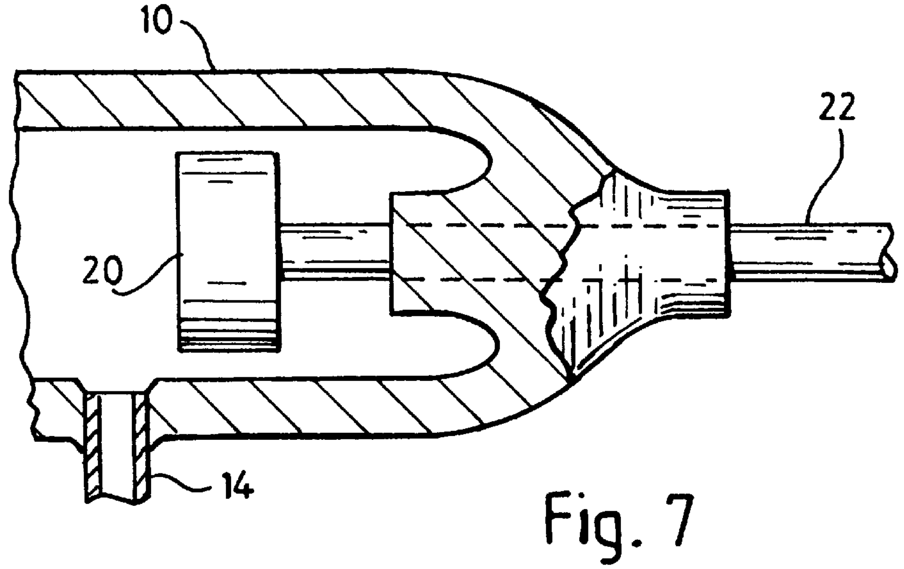

The establishment of a slight overpressure within the tube 10 whilst the fusing is occurring causes the internal surface of the fusing GS10 materials to assume a smooth concave form and by simultaneous working of the heated end of the tube 10 and the GS10 bead 26 whilst the fusing is occurring, so the external surface of the GS10 and frusto-conical end of the quartz tube can be blended so as to form a smooth external surface as well, as shown in FIG. 7.

Upon cooling the quartz tube is now fused via the GS10 bead to the GS10 sleeve which in turn is fused to the Tungsten rod 22.

Stress can be relieved in manner known per se by locally heating the tube 10 and the GS10 junction and closure using a small local source of heat and moving the source of heat axially relative to the assembly all in manner known per se.

An electrode similar to 20 can be mounted in the opposite end of the tube 10 in a similar manner except that the opposite end of the tube is now the closed end formed by the first part of the process and the introduction of Nitrogen gas to create an overpressure within the tube assembly must now be Introduced via the side tube 14.

Figure 8:
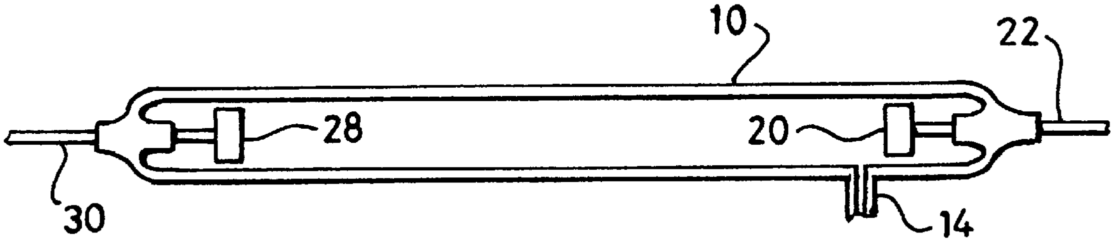
FIG. 8 shows a finished lamp tube constructed by a method in accordance with the invention.

FIG. 8 shows a completed lamp assembly with a second electrode 28 and Tungsten connection 30 extending from the left hand end as well as the electrode 20 and its associated connector 22 at the right hand end.

The lamp assembly so formed has been found to be of considerably greater strength and durability and less prone to fracture at the GS to GS seal than is the case with lamps constructed in accordance with the known method, in which a carbon tool was used to open up a sleeve of GS10 material formed by overpressure blowing of gas from within the tube after the step shown in FIG. 1 has been completed. It is believed that the introduction of the carbon tool into the interior of the lamp tube and in particular into contact with the interior of the GS10 material as a prelude to the fusing of the material around a bead 26 may have resulted in impurities and contamination in the GS to GS seal between the tube 10 and the rod 22, and these impurities or contaminants may have created local points of stress within the GS to GS seal, which may in turn have been a cause of the latter fracturing when in use.

Figure 9:
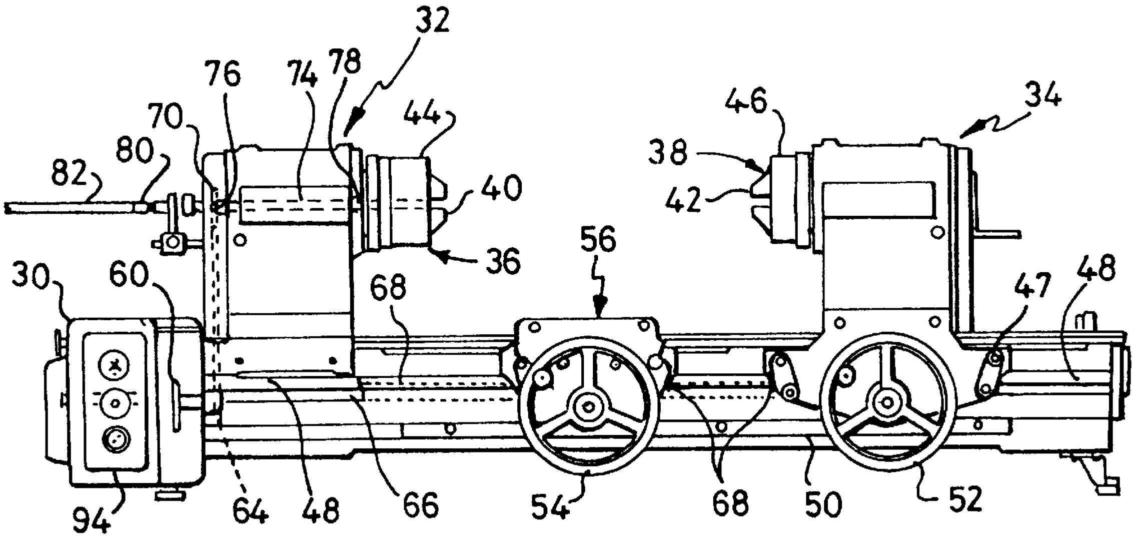
FIGS. 9 and 10 are respective side and end views of apparatus for use in performing the method.
Figure 10:
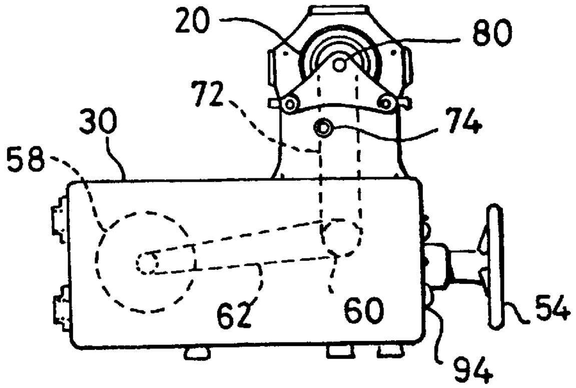

With reference to FIGS. 9 and 10, a lathe for performing the method comprises a base 30 on which a headstock 32 and tailstock 34 are mounted. The headstock and tailstock include rotatable chucks, respectively referenced 36 and 38, having jaws respectively referenced 40 and 42. In use, the jaws 40 receive the end of a quartz tube opposite that to which an electrode is to be applied, whilst the electrode rod is received in the jaws 42. The jaws 40 and 42 can be opened and closed by screwing and unscrewing collars 44 and 46 on the chucks 36 and 38. The chucks are held on the headstock and tailstock by bearing lock rings 41 and 43.

The headstock 32 is secured to a rail 48 extending along the base 30, whilst the tailstock 34 is slidably mounted on the rail 48 through a carriage 47 which includes a pinion wheel (not shown) which engages in a rack 50 running along the bottom of the bed 30. The pinion wheel is in turn connected to a hand wheel 52 which can be rotated so as to move the tailstock 34 towards or away from the headstock 32. The rack 50 also engages the pinion wheel (not shown) attached to the hand wheel 54 of a carriage 56 mounted between the headstock 32 and tailstock 34. The carriage 56 can optionally receive a burner, the flame of which can be moved along a glass tube in the lathe by rotating the wheel 54.

The end of the base 30 adjacent the headstock 32 includes a motor 58 which is in turn connected to a pulley wheel 60 via a tooth belt drive 62.

The pulley wheel 60 is attached to a further, coaxial pulley wheel 64 which terminates a shaft 66 which extends along the length of the base 30 below of the rail 48.

The shaft 66 carries a series of teeth which run along its length and extends through a bellows cover 68. The teeth on the shaft 66 mesh with the splined inner periphery of a pulley wheel which is rotatably mounted on the tailstock carriage 47. That pulley wheel is connected to the chuck 46 via a tooth belt drive and another pulley wheel (not shown) so that rotation of the shaft 66 causes a corresponding rotation of the chuck 46. Since the internal splined pulley wheel can slide along the shaft 66, the drive to the chuck 46 is maintained as the tailstock 34 is moved towards or away from the headstock 32. The carriages 56 and 47 both include wiper pads 69 which help to keep the rail 48 clean.

The motor 58 also supplies a drive to the chuck 44 through the pulley wheel 64 which is connected to a corresponding pulley wheel 70 on the chuck 44 by a tooth belt 72. A dolly roller 74 is resiliently biased against the belt 72 to maintain tension in the latter. A similar dolly roller (not shown) may be provided in the tailstock 34.

The pulley wheel 70 is connected to the chuck 36 through a spindle 74 which is rotationally keyed to both components to enable rotational drive to be transmitted from the pulley wheel 70 to the chuck 36. The spindle 74 is supported on spindle bearing 76 and 78, and is hollow to allow gas to pass therethough.

Figure 13:
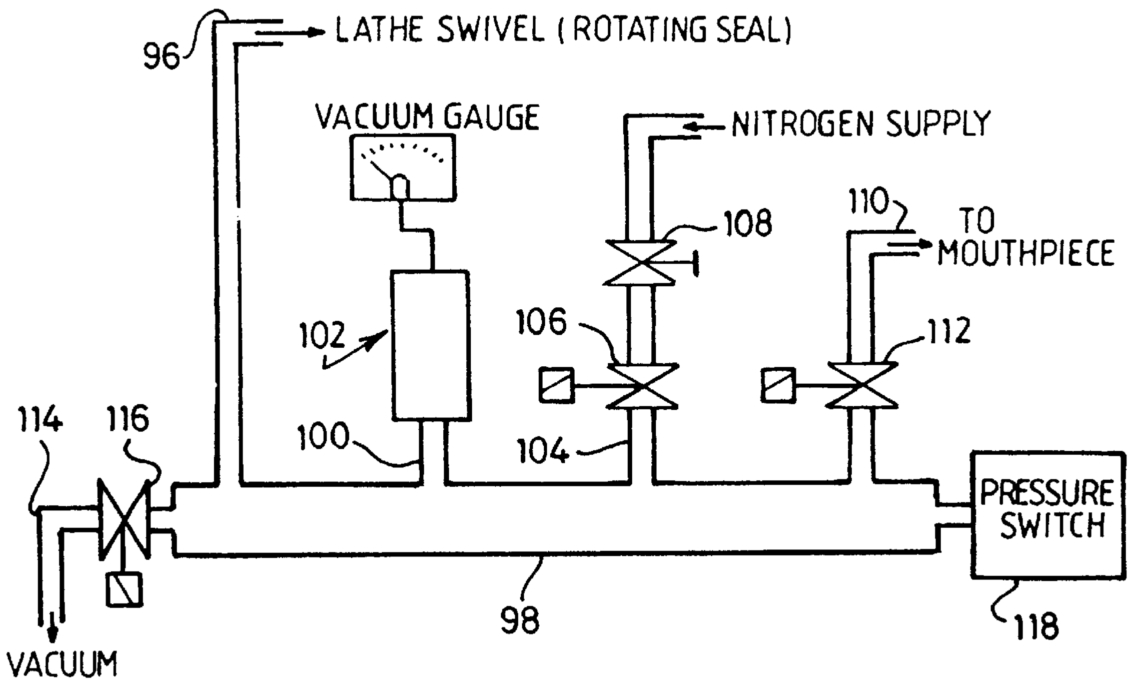
FIG. 13 is a schematic block diagram of gas and vacuum supply apparatus for connection to the apparatus shown in FIGS. 9 to 12.

Accordingly, the end of the spindle 74 remote from the chuck 36 is connected to a vacuum swivel 80 which incorporates a rotatable bearing seal through which the spindle 74 is connected to a pipe 82 in turn connected to the manifold assembly shown in FIG. 13.

Figure 11:
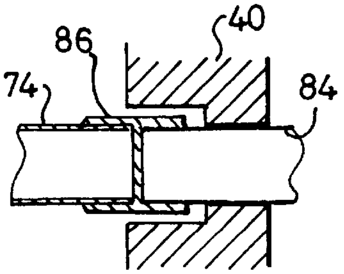
FIGS. 11 and 12 are sectional side view of part of the apparatus during different stages of the construction of a flash lamp tube.

The opposite end of the spindle 74 can be connected to the end of the tube forming the lamp body (referenced 84 in FIGS. 11 and 12) via a sealing sleeve 86 as shown in FIG. 11.

Figure 12:
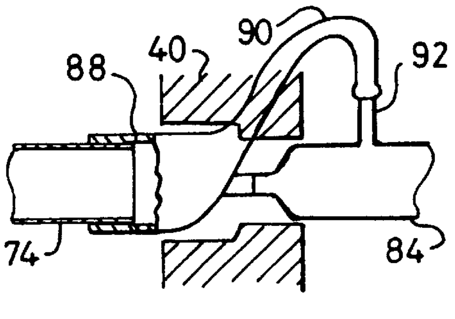

If the end of the lamp assembly to be secured on the chuck 44 is already attached to an electrode, as indicated in FIG. 12, the connection between the interior of the tube and the spindle 74 is instead achieved via an attachment 88 which includes a flexible pipe 90 connected to a side tube 92 which has already been fused to the lamp tube 84. It will be appreciated that the attachment 88, and hence the tube 90, rotates with the jaws 40, and hence the tube 84.

The diameters of the drive pulleys connecting the motor 58 to the chucks 36 and 38 are such that, in use, both chucks are driven at the same rotational speed, as well as in synchronism with each other. The speed at which the chucks are rotated can be controlled by means of a potentiometer control for the motor 58, which can be manipulated by suitable controls on a control panel 94.

With reference to FIG. 13, the vacuum swivel 80 is connected to a tube 96 which communicates with a manifold tube 98. The manifold tube 98 has a first branch tube 100 connected to a Pirani pressure gauge head (EDWARDS PRLOK) 102, an inlet tube 104 which is connected to a nitrogen supply via series connected solenoid and needle valves respectively referenced 106 and 108. The tube 98 is also connected to a flexible tube 110 which is terminated in the mouthpiece (not shown), and which communicates with the tube 98 through a solenoid valve 112. One end of the manifold tube 98 is connected to a two-stage rotary vacuum pump via connecting tube 114 and solenoid valve 116, whilst the other end of the tube 98 is connected to a pressure switch 118.

The solenoid valves 116, 106, 112 and the pressure switch 118 are all connected to control circuitry (not shown) which also controls the supply of operating current to the vacuum pump. In use, the circuitry causes the solenoid valves to cooperate so that they act with an interlocking relationship which prevents the vacuum pump being connected directly to the nitrogen supply or the mouthpiece while it is operating and the mouthpiece 112 from being connected to the pipe 96 when the pressure in the lamp tube 84 is below 1 atmosphere. The control circuitry is connected to a switch 120 on a control panel 94 on the lathe via which an operator can control the pressures within the tube 84 in the way described below.

Figure 14:
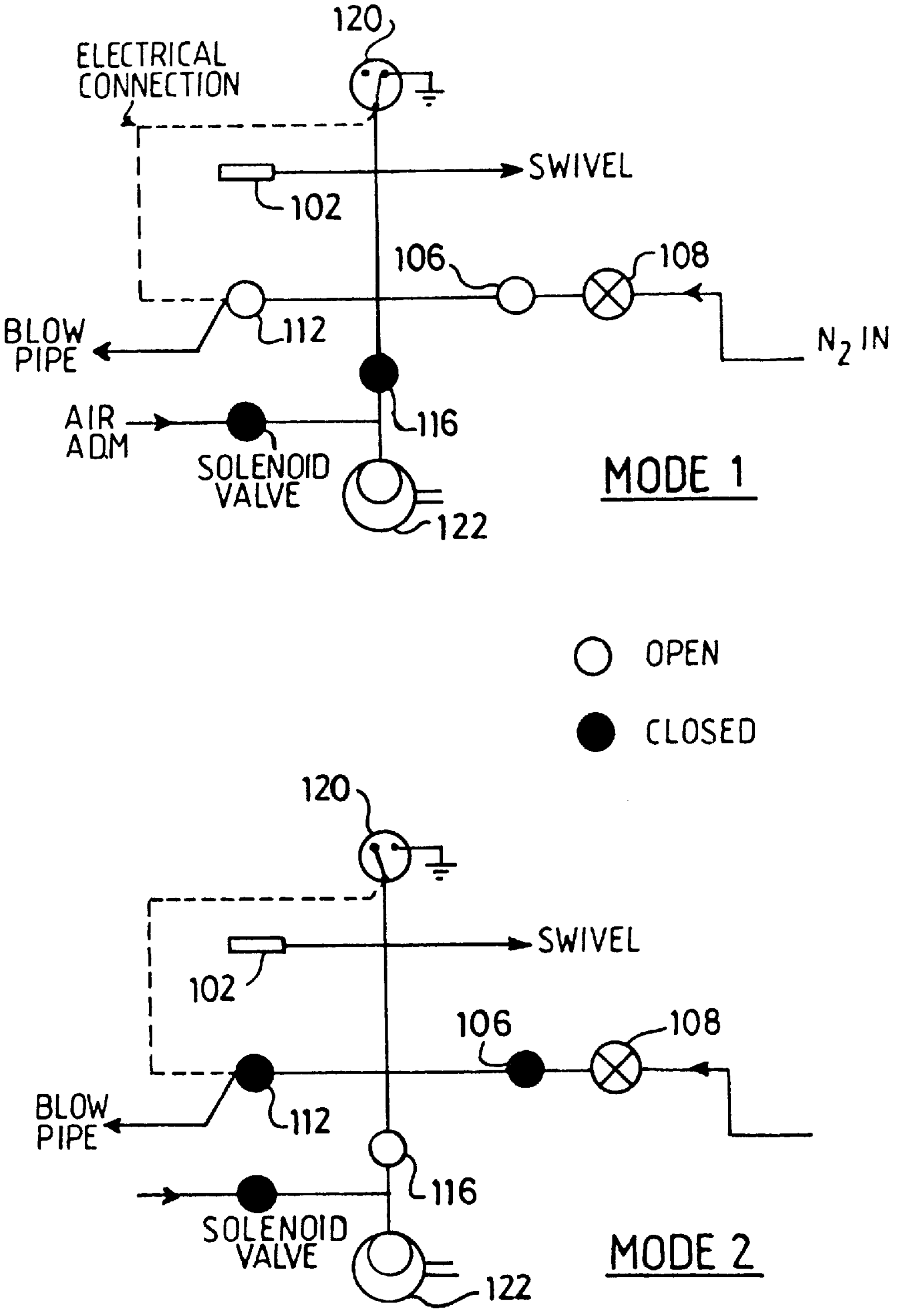
FIG. 14 is a diagram illustrating two modes of operation of the apparatus shown in FIG. 13.

FIG. 14 shows the modes of operation of the manifold assembly shown in FIG. 13. In the first mode, nitrogen is being supplied to the tube 84 such that the pressure in the tube is either a 1 atmosphere or greater Accordingly, the valves 106 and 112 are opened, whilst the valve 116 is closed and the pump 122 switched off. Thus, nitrogen can pass into the manifold tube 98 and out through the tubes 96 and 110. The operator's tongue can control the escape of nitrogen from the tube 110, and this can give sensitive control of the nitrogen pressure inside the tube 84. The mouthpiece is therefore used to control the shape of the molten portions of the tube 84.

The pressure switch 118 ensures that the valve 112 is not opened before the pressure in the tube 98 is above atmospheric pressure, and therefore also ensures that contaminants are not sucked through the mouthpiece into the tube 84. In the second mode of operation, the switch 120 is closed, thereby activating the pump 122 and closing the valves 106 and 112 and opening the valve 116. This enables gas to be extracted from the tube 84 through the tubes 96, 98 and 114.

The supply of nitrogen to the tube 114 may be at a pressure of approximately 12 psi, but is limited by the needle valve to an effective (adjustable) pressure of 3 to 5 psi.

We claim:

1. A method of forming glass to metal seal between one end of a glass lamp tube and a metal electrode, the method comprising the steps of:

(a) heating a metal rod terminated by the electrode and applying molten GS to the rod to form a sleeve of GS thereon;

(b) applying more molten GS to the sleeve to cause an annular build-up of GS to occur, thereby creating a GS bead on the sleeve;

(c) heating said end of the tube and spinning a bead of molten GS into and over the heated end of the tube so as to create a GS dome closing off the end of the tube;

(d) while said GS dome is hot, removing excess GS material from the dome so as to leave an annulus of GS on an end wall of said one end of the tube;

(e) inserting the electrode and rod into the tube until the GS bead is near to the GS annulus on the end wall of the tube;

(f) heating the tube and working the end thereof down to form a frusto-conical end so that the annulus of GS is now only just greater in diameter than the sleeve;

(g) axially moving the electrode and rod so as to bring the GS bead on the sleeve into contact with the annulus of GS on the now frusto-conical end of the tube, whilst maintaining a positive gas pressure within the tube, compared with the gas pressure on the exterior of the tube, at least until the bead touches and begins to fuse to the annulus;

(h) momentarily balancing the pressure between the inside and outside of the tube after the bead has begun to fuse to the annulus and, whilst said balancing is occurring, working the tube down onto the bead to cause it and the annulus of GS to become more completely fused; and (i) causing the gas pressure within the tube to become greater than the pressure of gas on the exterior of the tube, so as to obtain a smooth internal concave surface on the fused bead and annulus of GS.

2. A method according to claim 1, wherein the method comprises the further step of locally reheating the tube and seal using a movable, local source of heat, and moving the heat source axially along the tube so as to relieve stresses in the tube and seal.

3. A method according to claim 1, in which the method includes the further step of heating a portion of a wall defining the lamp tube while maintaining a positive has pressure within the tube, compared with the pressure of gas on the tube exterior, and pushing the end of a heated smaller diameter tube into said portion, so that said smaller diameter tube comprises a side tube which extends from said lamp tube, and which has an interior which communicates with the interior of the lamp tube.

4. A method according to claim 3, in which the smaller diameter tube is fused to the lamp tube before the excess GS is removed from the dome at the end of the lamp tube.

5. A method according to claim 1, in which the step of causing the gas pressure within the lamp tube to become greater than the gas pressure on the exterior of the tube is achieved by introducing gas into the lamp tube.

6. A method according to claim 5, in which said one end of the glass lamp tube is one of a pair of ends, and in which another electrode has already been fused to the other end of said pair of ends, wherein said gas is introduced to the lamp tube through a smaller tube which extends from the wall of said lamp tube.

7. A method according to claim 5, in which said gas is a non-oxidising gas which is stable and non-reactive within the lamp tube as it is worked.

8. A method according to claim 7, in which the gas is nitrogen.

9. A method according to claim 1, in which excess material is removed from the dome at the end of the tube by means of a tool which is brought into contact with the dome while the dome is molten and then moved away from the tube, taking a proportion of the GS material with it.

10. A method according to claim 9, in which the step of claim 7 is repeated until only about 5% of the dome remains on the tube.

11. A method according to claim 9, in which, after the removal of excess material from the GS dome, the dome is ruptured by the pressure thereon of gas within the tube and the dome is heated until the GS melts and moves back towards the tube to form said annulus.

12. A method according to claim 9, in which the tool comprises a rod of GS.

13. A method according to claim 1, in which the GS comprises seal glass.

14. A method according to claim 1, in which the lamp tube is formed of quartz glass, and the electrode and rod terminated by the electrode are tungsten.

15. A method according to claim 1, in which in steps (f) and (h) the working of the end of the tube comprises using a carbon tool which never comes into contact with the GS annulus.

16. A method of making a quartz lamp tube, the method comprising steps of forming a metal to glass seal between each end of a quartz tube and a respective metal electrode by a method according to claim 1 thereby attaching the electrode to the tube.

17. A method according to claim 16, in which the lamp tube is secured in a rotatable chuck whilst it is being worked on.

18. A method of forming one end of a partially completed lamp tube, the other end of which has already been formed, and the lamp tube communicating with a smaller side tube fused thereto, the method comprising the steps of:

(a) fitting the partially completed lamp tube into a rotatable chuck with the formed end inside the chuck;

(b) fitting to the smaller side tube a gas line to convey gas to the inside of the lamp tube via the side tube;

(c) heating said one end of the tube and spinning a bead of molten GS into and over the heated end of the tube to close off the tube with a dome of GS;

(d) reheating the GS dome and removing excess GS material to leave an annulus of GS on an end wall of said one end of the lamp tube;

(e) introducing a tungsten electrode having an integral axial support rod into said one end, the rod having a GS sleeve which includes a GS bead;

(f) heating the end one of the lamp tube, and working the end one down to form a frustro-conical end, then axially moving the rod relative to the lamp tube to bring the bead of GS and the annulus of GS into contact with each other, the annulus of GS thereby beginning to fuse to the bead of GS on the rod;

(g) momentarily balancing the pressure as between the inside and outside of the lamp tube, and working the external surface of the lamp tube down onto the bead to cause the GS material to more completely fuse and form a glass to metal seal between the rod and the lamp tube; and (h) increasing the internal gas pressure within the tube to ensure a smooth internal concave surface to the seal at the one end of the lamp tube.

19. A method according to claim 18, in which the gas conveyed to the inside of the lamp tube via the side tube is a non-oxidising gas which fills the tube, the method comprising the further step of applying a local source of heat to the side tube to seal the side tube, whilst maintaining an internal over pressure in the lamp tube, so that the charge of non-oxidising gas is retained in the lamp tube.

20. A method according to claim 19, in which the side tube is subsequently re-opened and connected to a vacuum source and/or appropriate gas source to create a partial vacuum, or allow for the introduction of a selected gas, into the lamp tube, before the side tube is finally re-sealed.

21. A process for the formation of a glass to metal seal at one end of a fused silica/quartz lamp tube as part of a process of manufacturing a complete lamp tube, comprising the steps of:

(a) preparing a tungsten electrode, having an axial tungsten rod support, to receive a sleeve of GS seal glass on said tungsten rod support, by heating and rotation about its longitudinal axis;

(b) heating a stick of GS seal glass and as the GS seal glass becomes molten, bringing it into contact with the rotating heated tungsten rod support, to cause the molten GS seal glass to become attached to and smeared over the surface of the rod to form a relatively uniform thickness sleeve over approximately 1–2 cms of the length of the rod;

(c) increasing the thickness of a central region of the sleeve by reheating and rotating it and heating a stick of GS seal glass, and whilst the sleeved rod is rotated, touching the end of the GS stick against the central region of the sleeve to cause an annular bead of GS seal glass to be formed on the sleeve;

(d) heating the lamp tube at one end whilst rotating it around its longitudinal axis, and closing the heated one end by spinning a bead of molten GS seal glass into and over the heated end of the lamp tube to form a dome of GS seal glass;

(e) heating one end of a smaller diameter side tube of fused silica/quartz, for use in the pressurizing of the interior of the lamp tube with a non-oxidising gas, and heating a region of the wall of the lamp tube until soft and pushing the heated one end of the smaller diameter side tube through the region of the wall of the lamp tube and fusing it to the lamp tube so as to extend radially as a side tube therefrom, and so that the interior of the lamp tube communicates with the interior of the side tube;

(f) reheating the dome closing off the one end of the lamp tube and removing excess GS seal glass from the dome so as to leave an annulus of GS seal glass on an end wall of said one end of the lamp tube;

(g) inserting the electrode and tungsten rod support into the one end of the lamp tube until the bead on the sleeve is near to the annulus of GS seal glass;

(h) heating the lamp tube and working the one end thereof down to form a frusto-conical end so that the annulus of GS seal glass is now only just greater in diameter than the sleeve around the tungsten rod;

(i) axially moving the electrode and rod so as to bring the bead on the rod into contact with the annulus of GS seal glass around the now frusto-conical end whilst maintaining a positive gas pressure within the lamp tube at least until the bead on the sleeve touches the annulus so that the bead on the sleeve and the annulus begin to fuse together;

(j) momentarily balancing the pressure between the inside and outside of the lamp tube after the bead and annulus have begun to fuse together and using a carbon tool to work the quartz tube down onto the bead and cause it and the annulus of GS seal glass to become more completely fused;

(k) increasing the internal gas pressure within the lamp tube to obtain a smooth internal concave surface on the GS seal glass, and (l) allowing the lamp tube and seal to cool and then locally reheating it using a moveable, local source of heat, and moving the heat source axially along the lamp tube, to stress relieve the lamp tube and seal.

* * * * *